United States Patent Office 3,160,945
Patented Dec. 15, 1964

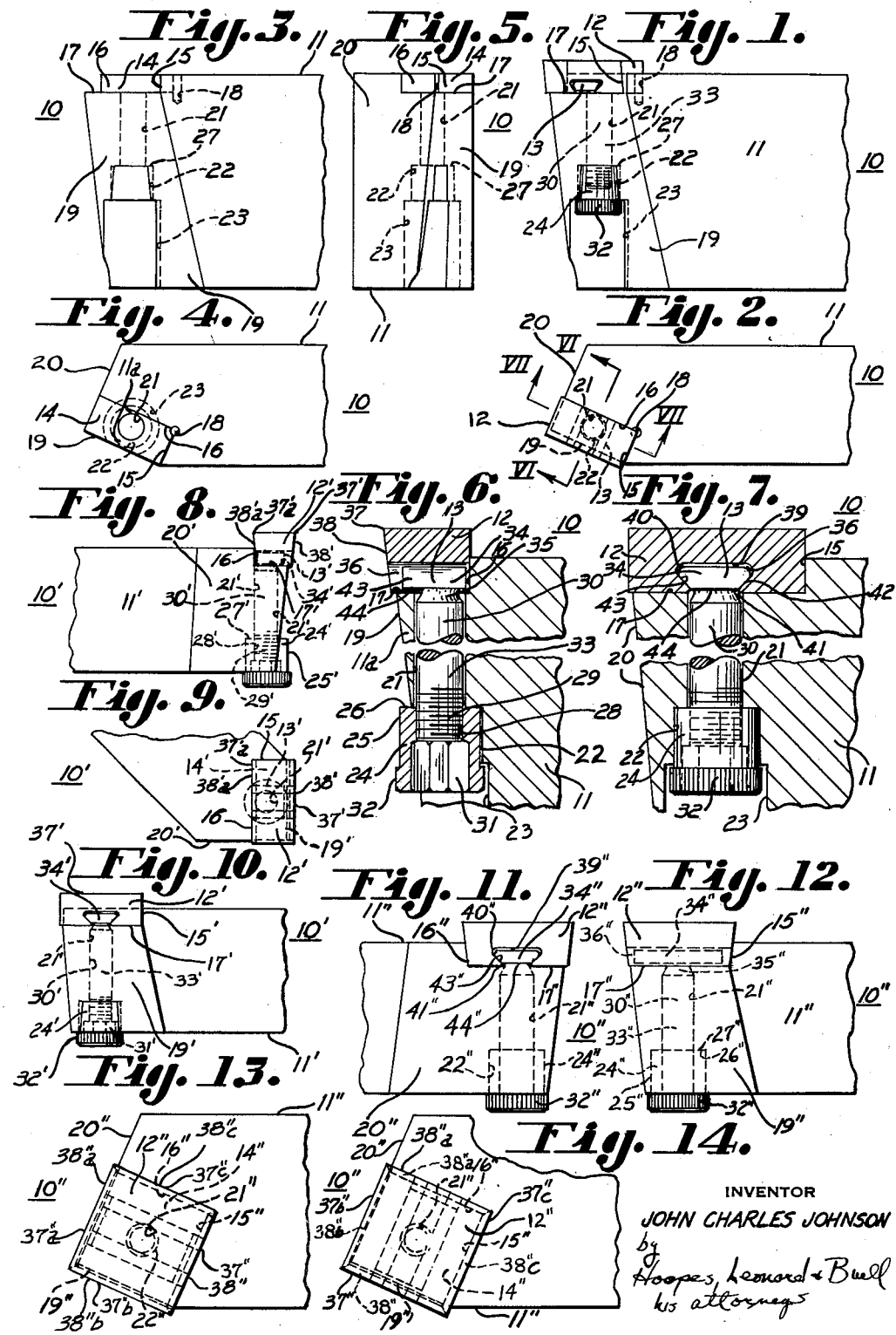

3,160,945
REPLACEABLE BIT TOOL
John Charles Johnson, North Huntington Township, Westmoreland County, Pa., assignor to Heppenstall Company, Pittsburgh, Pa., a corporation of Pennsylvania
Filed July 24, 1962, Ser. No. 211,971
6 Claims. (Cl. 29—96)

This invention relates to a mechanically-held bit tool utilizing a replaceable insert for cutting material such as metal and a cooperating open-sided pocket holder. More particularly, this invention comprises a bit tool combination having a carbide cutting insert held solely at the lower portion thereof in a trihedral supporting pocket in a tool body capable of withstanding forces generated by a cutting operation.

It also has been a common practice in bit cutting tools using a carbide insert to braze the insert to the sides of a recess in the tool nose, with many resulting problems. Thus, precise positioning of the insert relative to the remainder of the tool is relatively difficult to control and the heat required tends to introduce thermal strains and inhibit heat conduction from insert to tool body in the course of a cutting operation. Further, in replacing such an insert bit after it has been dulled, chipped or otherwise rendered unsuitable for further cutting use, the tool has to be removed to the shop to be heated high enough to melt the brazing compound before the old insert can be removed. And, before a fresh or replacement insert can be substituted and brazed to the tool, the recess has to be cleaned, which normally requires machining. Such machining eventually changes the dimensions of a bit recess too much for continued use of the tool body. Bit tools with a braze-held cutting insert have usually been preferred particularly for heavy duty services on lathes and in boring mills. In other cases heretofore, special forms of carbide or other sintered cutter metallic inserts have been provided in which clamping has been utilized extending above the cutter bit giving rise to interference with or obstruction of proper chip development sometimes with resulting damage to the work and spoilage to a greater or lesser extent, or requiring plural parts subject to wear, misalignment, uneven bearing, or shifting; or inserts are subject to fatigue, incipient cracking and/or fracture of the cutting bit, which normally is a relatively highly expensive and somewhat fragile part even though when sharp it will cut the hardest metals.

In mechanically held bit tools of this invention, the insert of carbide or other sintered cutter metal is specially shaped in the lower portion thereof to provide a keystone-shaped recess with planar lands for relatively large area surface contact and retention by a downwardly extending retainer having a correspondingly shaped head to mechanically hold the insert in a trihedral pocket support with upstanding sides and a flat bottom side angularly spaced from one another and open toward the work to be cut by such insert. In the course of a cutting operation, the body of the tool having such pocket provides uniform, constant and full support to corresponding sides of the bit insert, the bearing between bit insert and pocket is accurate, true and never changes, and, mechanically held to the bit insert of this invention, the tool body is virtually permanent inasmuch as dimensions of the pocket remain unchanged in the course of use of this invention. Further, cooperation of insert bit, retainer and pocket occurs on the lower side only of the bit so that the upper portion thereof is fully effective and available for use, for reuse after redressing without limitation, and for cutting operations without interfering with or restraining production or movement of chips across the free and uncluttered top of the cutting insert and tool body of this invention.

The cooperating insert recess and retainer head are stable and shaped to resist incipient cracking and fracture. At the same time, all cooperating elements of my bit tools are capable of being very quickly and simply loosened up when taken out of operation, as in the event that the insert is to be redressed, turned to a further cutting face, or replaced by a new bit.

Other objects, features and advantages of this invention will be apparent from the following description and the accompanying drawings, which are illustrative only, in which FIGURE 1 is a view in side elevation of the front end of a bit tool comprising one embodiment of this invention;

FIGURE 2 is a plan view of the embodiment shown in FIGURE 1;

FIGURE 3 is a view in side elevation of the embodiment shown in FIGURE 1 with the insert bit and retainer removed to show the bit pocket in the tool body;

FIGURE 4 is a view in plan of the tool body portion shown in FIGURE 3;

FIGURE 5 is an end view of the portion shown in FIGURE 3;

FIGURE 6 is an enlarged detailed view of the bit shown in FIGURES 1 and 2 in section taken along line VI—VI of FIGURE 2;

FIGURE 7 is an enlarged detail view of the bit shown in FIGURES 1 and 2 in section taken along line VII—VII of FIGURE 2;

FIGURE 8 is a view in elevation looking at the end of a modified bit tool embodiment of this invention employing a reversible insert bit;

FIGURE 9 is a plan view of the bit tool shown in FIGURE 8;

FIGURE 10 is a view in side elevation of the bit tool shown in FIGURE 8;

FIGURE 11 is a view generally in end elevation of a further modification of a bit tool of this invention utilizing a square insert bit element with four interchangeable cutting sides;

FIGURE 12 is a view generally in side elevation of such further modification;

FIGURE 13 is a view in plan of such further modification; and

FIGURE 14 is a plan view of such further modification with the insert bit and retainer thereof turned 90° to present another cutting edge to the work to be machined by such further modification.

Referring to FIGURES 1 to 7, inclusive, of the drawings, there is illustrated therein a bit tool 10 of this invention comprising a tool body 11 which may operate also as a tool shank, an insert bit 12 and a retainer 13. Although shown in the form of a single bit side cutting tool with a straight shank, it will be apparent that principles of this invention may be applied to single and multiple bit tools, to tools having unstraight shanks and to tools providing side, end and point cutting or a combination thereof, with, further, such relief, clearance and/or rake angles as may be desired. In the case of carbide or other sintered cutting insert 12, it has been ascertained that bit tool combinations of this invention provide stabilized support of the insert bits without subjecting them to incipient cracking, fracture, or chipping, and without in any way interfering with or restraining proper chip development and removal because of the clear unobstructed top of the bit tool, and, further without the trouble, cost and expense of brazed bit tools, or ones using other specially shaped inserts and clamping parts.

In the embodiment of FIGURES 1 to 7, inclusive, a trihedral support pocket 14 is provided with a rear end wall 15, an outer side wall 16 and a flat bottom wall 17, such end and side walls being planar and vertical and such bottom being planar and horizontal in the illustrated embodiment. A drilled hole 18 is used at the intersection or corner of the walls 15 and 16 to facilitate the milling out of pocket 14. A side face 19 below pocket 14 on the front end of body 11 is planar and provided with a downwardly and rearwardly extending slope at a side clearance angle selected by the maker or user thereof. Similarly, an end face 20 on the front end of body 11 is sloped downwardly and rearwardly to provide a planar face with an end clearance angle selected by the maker or user of bit tool 10. A downwardly extending vertical bore 21 is provided normal to bottom 17 and through the metal stock of the front end of body 11 as close to wall 16 as desired to provide sufficient metal thickness at 11a in view of the clearance angle of the tool for the stable holding of insert bit 12.

The lower end of hole 21 is counterbored at 22, which in turn is provided with a still lower counterbore 23 extending to the bottom of body 11 at the front end thereof, to accommodate a retainer nut 24. Nut 24 has a smooth cylindrical barrel exterior 25 which closely fits counterbore 22 and an upper shoulder 26 which fits against an annular shoulder 27 forming a step between hole 21 and counterbore 22, to assist in stable retention of insert 12 in bit tool 10 when nut 24 is tightened. Nut 24 is provided with an internally threaded portion 28 to engage the lower threaded end 29 of a headed retainer 30. The outer end of nut 24 is provided with a hexagonal recess 31, for an Allen wrench, by means of which retainer 30 and tool 10 can be tightened and loosened. Nut 24 also has a cylindrical milled exterior edge 32 which is accommodated by the further counterbore 23 in the particular embodiment being described.

Retainer 30 has a cylindrical unthreaded stem portion 33 between lower threaded portion 29 and an offset head 34 which is of keystone-shape in end view. Head 34 is connected to stem 33 by a necked portion 35 to ensure that the pull of head 34 on insert 12 and the seating thereby of insert 12 in pocket 14 is relatively uniform and even. Moreover, head 34 when viewed as shown in FIGURE 6 is offset or asymmetrical to provide maximal even surface area contact between head 34 and the bearing land portions 42 of a complementary keystone-shaped recess 36 in the lower portion of bit 12, so that as shown, head 34 extends within recess 16 substantially from wall 16 to the top of face 19, such being the narrower dimension in plan of the rectangular standard style insert used for illustration in this embodiment.

Bit 12 is a generally rectilinear insert of cutting tool carbide having a side cutting edge 37 and a side cutting face 38 with a relief angle usually chosen between 6° and 8°. The other sides of the bit 12 shown are vertical and the bottom and top of the illustrated insert are horizontal. As used in this specification, terms such as "vertical," "horizontal," "upward" and "downward" are relative rather than absolute since bit tools may be used with and without being inclined and at various angles to vertical and/or horizontal reference lines or planes. In the construction of insert 12, it is provided with a keystone-shaped recess 36 in the lower portion of the bit from one side to the other, the recess in cross section occupying a minor portion of the insert at that location. The recess preferably has a substantially flat roof 39 and is free of sharp leverage corners, the upper internal corners 40 having a substantial radius of curvature to inhibit fracture and crack starts and the lower outside curvature fillets 41 having a suitable radius of curvature to avoid becoming a fragile or fractureable feather edge along the length of recess 36. The upwardly facing slope or land areas 42 between corners 40 and 41 on each side of recess 36 are substantially planar and extend for the length of the recess on each side, thereby affording a relatively large even surface area bearing for corresponding downwardly facing sloped substantially planar portions 43 on the sides of head 34 between respectively its upper corners as viewed from its end and the underside 44 of head 34, which does not extend below, or pass out through the elongated opening between fillets 41. Nor does retainer 30 touch corners 40 or 41, preferably.

Consequently, when bit 12 is placed in pocket 14 with head 34 in recess 36 and nut 24 is tightened, insert 12 is rigidly and immovably retained in its properly supported position in pocket 14 in tool 10 and receives full support from surfaces of pocket 14 to withstand stresses of a cutting operation. Such surface area contact bearing between retainer 30 and bit 12 co-acts with support from pocket 14 in use without subjecting insert 12, although a sintered metallic cutting bit, to cracking or fracturing and, further, without in any way interfering with all normal uses thereof, or giving obstruction or interference with proper production and movement of chips caused by such a cutting operation of bit tool 10.

In the second modification of this invention shown in FIGURES 8 to 10, inclusive, parts corresponding generally in structure and function to those set forth in the above first-described embodiment are provided with the same reference numerals with the addition of a prime accent thereto, respectively. In such modified embodiment, the tool shank or body 11' has somewhat less mass and over-all height with the result that there is no counterbore required corresponding to counterbore 23, the retainer 30' stably holding insert 12' in pocket 14' in the manner above described, with appropriate overhang and with an uncluttered sweep extending over the tops of bit 12' and body 11'. Insert bit 12', further, is provided with a relief angle on its exposed face 38' and on its opposite face 38'a so as provide a reversible cutting edge 37'a instantly available when edge 37' becomes dulled. Such face 38'a is snug up against side 16' which engages face 38'a at the top of such side without there being any tendency for the bit to slide up or "kite" to make face 38'a flush with side 16'. On the other hand, the engagement between the end of bit 12' snug against wall 15' is coplanar, as is the bottom of bit 12' against bottom side 17'. The engagement between retainer 30' and bit 12' and between pocket 14' relative to insert 12' provide stability, support and back-up for a cutting operation by bit 12' despite the small triangular spacing between side wall 16' and face 38'a where the two are not in engagement. The upper edges of the walls 15' and 16' reach at least as high as the middle one-third of the overall height of the insert 12', the top of body 11' preferably being somewhat lower than the top of bit 12'. The operation of bit tool 10' is the same as that of the first-described embodiment above except that when it is desirable to present a new cutting edge 37'a to the work being machined, the machine is stopped and retainer 30' is loosened by unscrewing nut 24', after which bit 12' is reversed by sliding it off head 34', turning it 180° and resliding recess 36' over head 34' to place face 38' against side wall 16'. After that, retainer 30' is retightened and the operation of cutting is continued in a matter of moments with the cutting edge 37'a of the interchangeable face 38'a.

In the third or further modified embodiment of this invention shown in FIGURES 11 to 14, inclusive, parts thereof generally corresponding in structure and function to parts of the previously described embodiments are again provided with the same reference numerals, respectively, except that such reference numerals bear a double prime accent for parts of such third embodiment. In such further modification, bit 12" is square in plan and each face is identical and respectively numbered 38", 38"a, 38"b and 38"c. Each such face has an appropriate relief angle and an upper cutting edge 37" at its corner formed at the intersection of face 38" and the flat top surface of the insert 12" in the embodiment being described. However, head 34" of retainer 30" is symmetrical relative to stem 33" in side elevation as shown in FIGURE 12, although again it extends for substantially the length of the recess 36″ and width of pocket 14″, such head being above bottom 17″ of the pocket 14″. Because bit 12″ is square and each face has a cutting edge making four interchangeable ones, bit 12″ can be used four times longer by changing to a new cutting edge 37″ above face 19″ before the bit 12″ is removed for resharpening or redressing. Each time a fresh cutting edge 37″ is to be presented, nut 24″ is loosened and bit 12″ is turned at least 90° to present another cutting edge above face 19″. Retainer 30″ also can be rotated when loosened sufficiently, as shown by FIGURES 13 and 14, so that but a single recess 36″ is required in all four interchangeable positions of bit 12″ in pocket 14″. Further, pocket 14″ in body 11″ is provided with upwardly flared upstanding sides 15″ and 16″ at the supplement of the relief angle of the faces 38″ so that bit face to pocket side engagement on all three walls of pocket 14″ is coplanar relative to the contacting surfaces of bit 12″, respectively. Thus, this third modification of this invention provides cutting bit, retainer and pocket cooperation for multiple rotation of a bit to present a new cutting edge on the bit tool 10″ without change of parts or loss of the stable retention and support provided by this invention.

Various changes may be made in details of the illustrated embodiments and other embodiments provided without departing from the spirit of this invention or the scope of the appended claims.

I claim:

1. A bit tool comprising, in combination, a tool body having an open-topped and open-sided pocket in the upper front portion thereof, said pocket having at least two smooth upright sides at an angle to one another and a smooth bottom side generally perpendicular to said upright sides, a generally polyhedral cutting insert bit having at least three smooth sides to fit in said pocket without brazing and directly engage at least two of said pocket sides in surface contact support relation in the course of a cutting operation, said bit having a generally T-headed recess in the lower portion thereof opening out through at least one side of said bit and downwardly toward said bottom side of said pocket when said bit is therein, said recess being preformed and having rounded corners and comprising a larger holding portion above a smaller passage portion, said holding portion having upwardly facing surfaces to each side thereof, a retainer having a generally T-headed shaped head to slide into said recess and engage said surfaces to retain said bit in said pocket without movement, said retainer further having a stem narrower than said head extending downwardly through said passage portion and a bore in said tool body downwardly from said bottom side, and threaded means to hold the lower end of said retainer in fixed relation against a lower portion of said tool body below said pocket to removably secure said bit therein in smooth surface contact engagement.

2. A bit tool as set forth in claim 1, comprising, said recess being keystone-shaped in cross section, straight in length and opening out through opposite upstanding faces of said bit, said recess having upper inside corners and lower outside corners respectively in said holding and passage portions, said respective corners having selected radii of curvature adapted to inhibit incipient cracking and fracture of said bit, said head of said retainer being wholly within and having a length approximating the length of said recess at least above said bottom side, said retainer further having a necked portion immediately below said head to insure coplanar seating of said bit against said bottom side of said pocket.

3. A bit tool as set forth in claim 1, comprising a bore through said tool body extending downwardly from said bottom side in generally perpendicular relation thereto for said stem, said bore having a counterbore at the lower end thereof, said stem having a lower threaded end, said means comprising a cylindrical nut to engage said lower threaded end and having a shouldered cylindrical exterior to engage the surface of said counterbore and hold said retainer and bit in stable support relation in said pocket.

4. A bit tool as set forth in claim 1, comprising, said bit having a height at least as great as the height of said pocket and the height of said pocket extending upwardly at least as far as the upper surface of said tool body at least in the zone thereof adjacent said pocket.

5. A bit tool comprising, in combination, a tool shank having a bit supporting end, an open-topped pocket in the top of said end having at least one substantially trihedral corner and two smooth generally vertical sides at a substantial angle to one another and a smooth substantially horizontal bottom side, said pocket being open on the remaining side portion thereof, said tool shank having clearances extending below said remaining sides, a polygonal sintered carbide cutting bit to fit in said pocket without brazing and engage said sides in direct contact therewith for support in the course of a cutting operation by said bit, said bit having upright faces, a top and a smooth flat bottom for surface contact on said bottom and with at least one of said generally vertical sides, said top being substantially at least as high as the top of said bit supporting end, said tool shank having a downwardly extending bore counterbored at the lower end thereof, said bore extending through said bottom side in perpendicular relation thereto, said bit having a straight keystone-shaped recess in the lower portion of said bit extending straight through said bit from one upright face thereof to the opposite face and opening out through the bottom of said bit in intersecting relation with the axis of said bore when said bit is in operative position in said pocket, said recess having internal corners and external corners with selected radii of curvature adapted to inhibit incipient cracking and fracturing when said bit is retained in said pocket, a retainer bolt having a keystone-shaped head to fit said recess and into which it is insertable by endwise sliding movement, said head being substantially out of contact with the top of said recess and said corners when in said recess, said recess and said head having respectively inclined upwardly facing and downwardly facing planar sides to engage in surface area contact when said bit is so retained, said retainer bolt having a stem threaded at least at its lower end to extend downwardly through said bore and into said counterbore, a nut to engage the lower threaded end of said retainer bolt with the exterior of said nut in stable bit retaining relation to some portion of said counterbore, whereby an insert bit may be mechanically held in a bit tool in readily insertable and removable relation thereto, receiving uniform surface area support from said tool shank in the course of a cutting operation without detriment to said bit and provide a clean unobstructed sweep over the top of said bit and tool body to avoid interference with chip production and discharge in the course of said cutting operation.

6. A bit tool as set forth in claim 5, comprising, said substantially vertical sides flaring upwardly and outwardly at an angle to supplement the relief angle of said bit faces to provide planar surface contact between all of said substantially vertical sides and said upright faces when said bit is inserted into operative position in the pocket, and said bit being rotatable about a substantially vertical axis to present at least one selected upright face at said remaining open side portion.

References Cited in the file of this patent

FOREIGN PATENTS

| 249,179 | Switzerland | Mar. 16, 1948 |
| 1,084,955 | France | July 21, 1954 |
| 1,245,148 | France | Sept. 26, 1960 |

OTHER REFERENCES

Kennametal Catalog No. 54, Nov. 1953, p. 38, copy in Group 340.